(12) United States Patent
Seo et al.

(10) Patent No.: US 8,514,960 B2
(45) Date of Patent: Aug. 20, 2013

(54) APPARATUS AND METHOD FOR COMPENSATING FEEDBACK PATH DISTORTION

(75) Inventors: Jae-Hyun Seo, Daejon (KR); Heung-Mook Kim, Daejon (KR); Ho-Min Eum, Daejon (KR); Sung-Ik Park, Daejon (KR); Jae-Young Lee, Seoul (KR); Jong-Soo Lim, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1100 days.

(21) Appl. No.: 12/517,924

(22) PCT Filed: Dec. 5, 2007

(86) PCT No.: PCT/KR2007/006291
§ 371 (c)(1),
(2), (4) Date: Jun. 5, 2009

(87) PCT Pub. No.: WO2008/069580
PCT Pub. Date: Jun. 12, 2008

(65) Prior Publication Data
US 2011/0013688 A1 Jan. 20, 2011

(30) Foreign Application Priority Data

Dec. 8, 2006 (KR) .................. 10-2006-0125125
Aug. 17, 2007 (KR) .................. 10-2007-0082658

(51) Int. Cl.
*H04B 7/02* (2006.01)

(52) U.S. Cl.
USPC ........... 375/267; 348/608; 375/296; 398/193; 455/114.3

(58) Field of Classification Search
None
See application file for complete search history.

(56) References Cited

U.S. PATENT DOCUMENTS

| 5,802,079 A | 9/1998 | Wang |
| 2002/0186763 A1 | 12/2002 | Kennedy et al. |
| 2004/0008764 A1 | 1/2004 | Seo et al. |
| 2005/0094752 A1* | 5/2005 | Frahm et al. .............. 375/350 |

FOREIGN PATENT DOCUMENTS

| KR | 1020040005250 A | 1/2004 |
| KR | 1020060101648 A | 9/2006 |
| WO | 99/05869 A2 | 2/1999 |
| WO | 03/034673 A2 | 4/2003 |

OTHER PUBLICATIONS

International Search Report; mailed Mar. 14, 2008; PCT/KR2007/006291.

\* cited by examiner

*Primary Examiner* — Adolf Dsouza
(74) *Attorney, Agent, or Firm* — Ladas & Parry LLP

(57) ABSTRACT

Provided are an apparatus and method for compensating a feedback path distortion in a digital broadcasting signal. The apparatus for improving a performance of a pre-equalizer in a transmitter of a digital broadcasting system having a feedback path for adaptively generating a filter coefficient of the pre-equalizer, includes a reference signal generator for generating a reference radio frequency (RF) signal, a feedback path estimator for estimating transmission band characteristic information for the feedback path based on the reference RF signal generated from the reference signal generator, and a feedback path compensator for compensating a demodulated signal transferred through the feedback path based on the estimated transmission band characteristic information from the feedback path estimator and generating a filter coefficient of the pre-equalizer.

9 Claims, 4 Drawing Sheets

APPARATUS AND METHOD FOR COMPENSATING FEEDBACK PATH DISTORTION

TECHNICAL FIELD

The present invention relates to an apparatus and method for compensating a feedback path distortion in a digital broadcasting signal; and, more particularly, to an apparatus and method for compensating a feedback channel distortion using a tone signal to improve the performance of a pre-equalizer by estimating amplitude distortion and phase distortion in a transmission band of a feedback path for transferring a signal from a channel filter to a VSB demodulator and compensating the feedback channel distortion based on the estimated result in a repeater and a vestigial side band (VSB) transmitter of a terrestrial wave digital broadcasting system.

This work was supported by IT R&D program of MIC/IITA [2006-S-016-01, "Development of Distributed Translator Technology for Terrestrial DTV"].

BACKGROUND ART

A terrestrial digital broadcasting system transmits a terrestrial signal through an allocated channel with high power using a transmitter and a repeater. The transmitter and the repeater include a channel filter at end thereof. In general, an analog broadcasting scheme uses a taboo channel to reduce the interference to adjacent channel. For example, if a broadcasting station uses the $9^{th}$ channel, the other broadcasting station cannot use adjacent channels of the $9^{th}$ channel which are the $8^{th}$ channel and the $10^{th}$ channel in the analog broadcasting scheme. However, a digital broadcasting scheme can use such adjacent channels. That is, the digital broadcasting scheme can effectively utilize limited frequency resources. In order to use the adjacent channels, a channel filter is used at the end of a digital broadcasting transmitter and repeater. The channel filter is a bandpass filter for removing unnecessary frequency components so as to reduce the interference in the adjacent channels.

However, the channel filter has a disadvantage that deteriorates the quality of a transmitting signal because the channel filter has amplitude response characteristics and group delay response characteristics in a non-uniform band. In order to overcome the disadvantage of the channel filter, a pre-equalizer is used.

FIG. 1 is a block diagram illustrating a wireless transmitting block in a VSB transmitter and a repeater according to the related art.

Referring to FIG. 1, the vestigial side band (VSB) transmitter converts TV programs to a digital signal and transfers the digital signal to a transmitting block. Meanwhile, the repeater receives a radio signal from the transmitter and transfers the received radio signal to the transmitting block in order to retransmit the received radio signal. The wireless transmitting blocks of the VSB transmitter and the repeater have the same configuration.

A pre-equalizer 101 is disposed in the front of the VSB modulator 102 to compensate the amplitude distortion and the group delay distortion of the channel filter 106. The pre-equalizer 101 outputs an equalized signal to the VSB modulator 102, and the VSB modulator 102 modulates the equalized signal to a predetermined format.

That is, the VSB modulator 102 outputs a VSB modulated intermediate frequency (IF) digital signal. The VSB modulator 102 outputs the VSB modulated IF digital signal to the digital-to-analog converter 103. The digital-to-analog converter 103 converts the VSB IF digital signal to an analog IF signal. Then, a frequency up converter 104 receives the analog IF signal from the digital-to-analog converter 103 and up-converts the received analog IF signal to an analog radio frequency (RF) signal. A high power amplifier 105 receives the analog RF signal and amplifies the received analog RF signal to the high power analog RF signal. Finally, the high power analog RF signal is transmitted through a transmission antenna after passing through the channel filter 106.

An adaptive pre-equalizer for changing a tap coefficient according to a channel state may be disposed in the front end of the VSB modulator 102 as the pre-equalizer 101. In order to calculate the tap coefficient of the pre-equalizer 101, a signal coupled with the output signal of the channel filter 106 is inputted to the frequency down converter 107.

The frequency down converter 107 converts the coupled analog RF signal to an analog IF signal. The analog-to-digital converter 108 converts the analog IF signal to the digital IF signal. The VSB demodulator 109 receives the digital IF signal and restores a baseband signal from the digital IF signal.

A pre-equalizer filter coefficient generator (not shown) calculates a tap coefficient for the pre-equalizer 101 using the restored baseband digital signal from the VSB demodulator 109 and the input signal of the VSB modulator 102. The pre-equalizer 101 also compensates the amplitude distortion and the phase distortion in a transmission band, which are generated in a path from the VSB modulator 102 to the channel filter 106 as well as compensating the amplitude distortion and group delay distortion in the band of the channel filter 106.

However, the amplitude distortion and the phase distortion are also generated in a transmission band of a feedback path from the channel filter 106 to the VSB demodulator 109. Accordingly, the tap coefficient of the pre-equalizer may have error because the pre-equalizer filter coefficient generator (not shown) uses the output signal of the VSB demodulator 109 to calculate the tap coefficient of the pre-equalizer 101. As a result, the performance of the pre-equalizer is deteriorated due to the error of the tap coefficient.

DISCLOSURE OF INVENTION

Technical Problem

An embodiment of the present invention is directed to providing an apparatus and method for compensating a feedback channel distortion using a tone signal to improve the performance of a pre-equalizer by estimating amplitude distortion and phase distortion in a transmission band of a feedback path for transferring a signal from a channel filter to a VSB demodulator and compensating the feedback channel distortion based on the estimated result in a repeater and a vestigial side band (VSB) transmitter of a terrestrial wave digital broadcasting system.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for improving a performance of an pre-equalizer in a transmitter of a digital broadcasting system having a feedback path for adaptively generating a filter coefficient of the pre-equalizer, including: a reference signal generator for generating a reference radio frequency (RF) signal; a feedback path estimator for estimating transmission band characteristic information for the feedback path based on the reference RF signal generated from the reference signal generator; and a feedback path compensator for compensating a demodulated signal transferred through the feedback path based on the estimated transmission band characteristic information from the feedback path estimator and generating a filter coefficient of the pre-equalizer.

The apparatus may further include a first switch for selecting one of a RF signal outputted from a channel filter of the transmitter and a reference RF signal generated by the reference signal generator according to a switching control signal and outputting the selected signal to the feedback path and a second switch for selecting one of a demodulator and the feedback path estimator and outputting a digital IF signal transferred through the feedback path to the selected one.

The feedback path estimator estimates the transmission band characteristic information for the feedback path by comparing a digital IF signal generated by converting a reference RF signal, which is generated from the reference signal generator while the reference frequency signal is passing through the feedback path, with the reference signal from the reference signal generator.

The apparatus may further include a filter coefficient generator for generating the filter coefficient of the pre-equalizer using a signal with the amplitude distortion and the phase distortion in the transmission band of the feedback path compensated by the feedback path compensator.

In accordance with another aspect of the present invention, there is provided a method for improving a performance of a pre-equalizer in a transmitter of a digital broadcasting system having a feedback path for adaptively generating a filter coefficient of the pre-equalizer, including the steps of: a) generating a reference RF signal; b) estimating transmission band characteristic information for the feedback path based on the generated reference signal; C) compensating a demodulated signal transferred through the feedback path based on the estimated transmission band characteristic information for the feedback path; and d) generating a filter coefficient of the pre-equalizer using the compensated signal.

Advantageous Effects

An apparatus and method for compensating a feedback channel distortion using a tone signal according to an embodiment of the present invention can improve the quality of a transmitting signal by optimizing the performance of a pre-equalizer in a VSB transmitter and a repeater in a terrestrial digital broadcasting system. Also, the apparatus and method for compensating a feedback channel distortion using a tone signal according to an embodiment of the present invention can improve the performance of a transmission system using a reference signal such as a pre-equalizer by estimating amplitude distortion and phase distortion in a transmission band of a feedback path formed of a frequency down converter, an analog-to-digital converter, and a demodulator, and compensating the estimating result.

MODE FOR THE INVENTION

The advantages, features and aspects of the invention will become apparent from the following description of the embodiments with reference to the accompanying drawings, which is set forth hereinafter.

Figure 1:
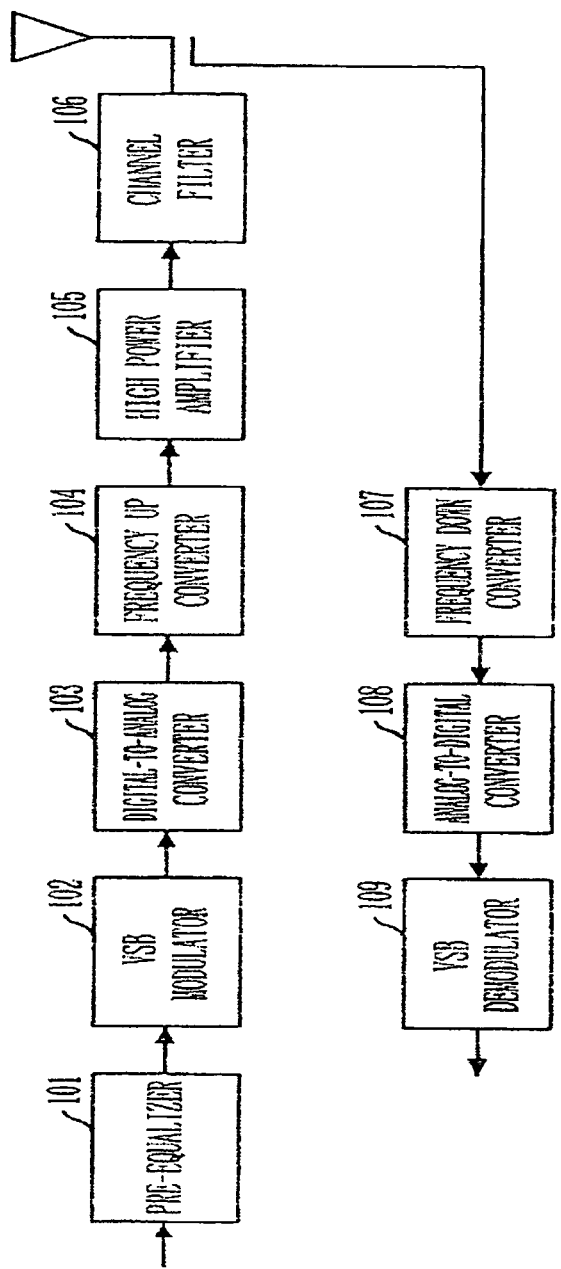
FIG. 1 is a block diagram illustrating a transmission block of a VSB transmission apparatus and a repeater according to the related art.
Figure 2:
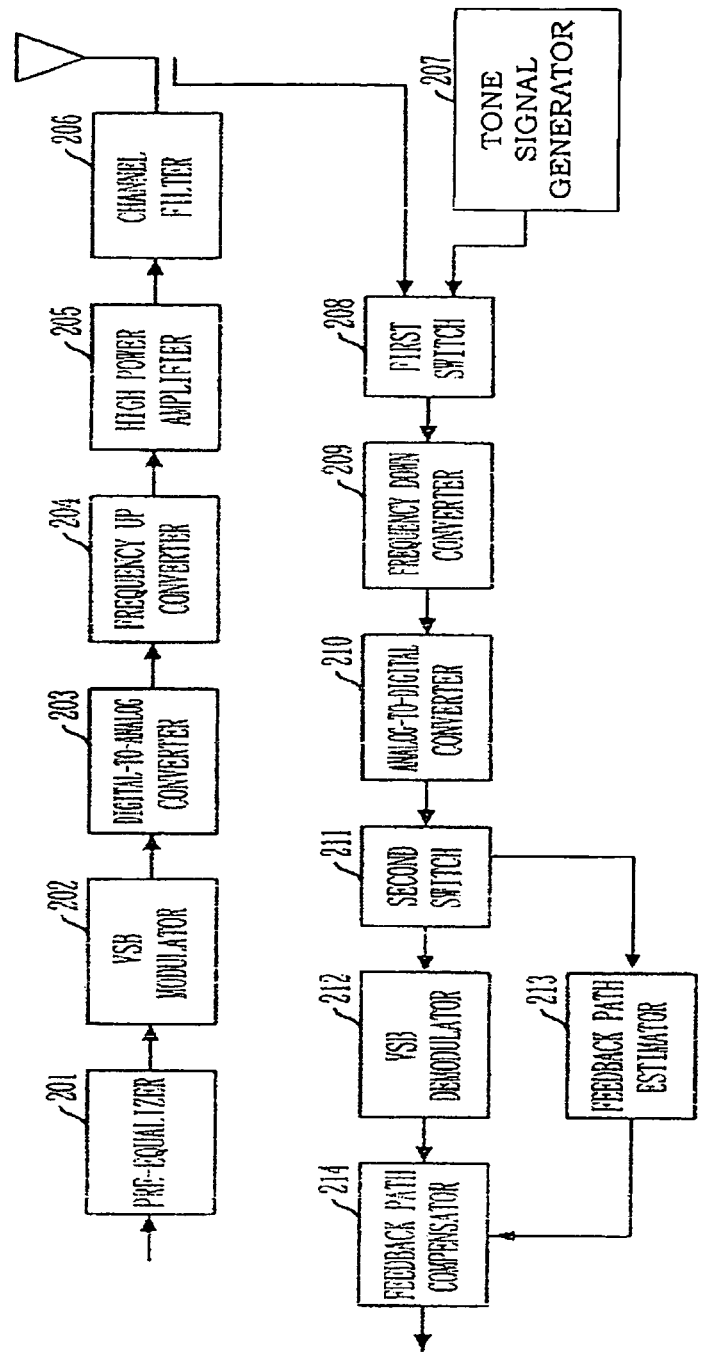
FIG. 2 a block diagram illustrating a transmission block of a VSB transmission apparatus and a repeater in accordance with a predetermined embodiment of the present invention.

FIG. 2 is a block diagram illustrating a transmission block in a VSB transmitter and a repeater in accordance with an embodiment of the present invention.

Referring to FIG. 2, the transmission block according to the present embodiment includes a pre-equalizer 201 in the front of the VSB modulator 202 for compensating the amplitude distortion and the group delay distortion in a band of a channel filter 206 similar to the transmission block of the VSB transmitter and the repeater according to the related art. As described above, the VSB modulator 202 outputs the VSB modulated IF digital signal to the digital-to-analog converter 203, and the digital-to-analog converter 203 converts the digital IF signal to an analog IF signal. A frequency up converter 204 receives the analog IF signal from the digital-to-analog converter 203 and converts the analog IF signal to the analog RF signal. A high power amplifier 205 amplifies the analog RF signal. The amplified analog RF signal is transmitted through an antenna after passing through a channel filter 206.

An apparatus for compensating a feedback path according to the present embodiment includes a tone signal generator 207, a first switch 208, a second switch 211, a feedback path estimator 213, and a feedback path compensator 214. The tone signal generator 207 generates an analog RF tone signal of a corresponding frequency in a transmission band. The first switch 208 transfers a coupled signal from a channel filter in response to the control of the VSB demodulator 212 or a tone signal generated from the tone signal generator 207.

The second switch 211 transfers the digital IF signal from the analog-to-digital converter 210 to a VSB demodulator or a feedback path estimator 213. The feedback path estimator 213 estimates amplitude distortion and phase distortion in a transmission band of a feedback path by comparing the digital IF signal from the second switch 211 and the reference tone signal generated from the tone signal generator 207. The feedback path compensator 214 compensates a demodulated signal inputted from the VSB demodulator 212 using the amplitude distortion characteristics and the phase distortion characteristics in the transmission band for the estimated feedback path estimated by the feedback path estimator 213.

Hereinafter, the apparatus for compensating a feedback path distortion according to the present embodiment will be described in detail with reference to FIG. 2.

The tone signal generator 207 generates an analog RF tone signal of a target frequency corresponding to a transmission band. The first switch 208, which switches the RF signal in response to the control of the VSB demodulator 212, transfers the analog RF tone signal generated from the tone signal generator 207 to the frequency down converter 209. The VSB demodulator 212 controls the first switch to input the RF tone signal from the tone signal generator 207 to the frequency down converter 209 when it is estimated that the amplitude distortion and the phase distortion are generated in the transmission band for the feedback path.

The frequency down converter 209 converts the analog RF tone signal from the first switch 208 to the analog IF tone signal and outputs the analog IF tone signal to the analog digital converter 210. The analog-to-digital converter 210 converts the analog IF tone signal inputted from the frequency down converter 209 to a digital IF tone signal and outputs the digital IF tone signal to the second switch 211.

The second switch 211, which switches the intermediate frequency signal in response to the control of the VSB demodulator 212, outputs the digital IF tone signal to the feedback path estimator 213.

The feedback path estimator 213 estimates amplitude distortion and phase distortion in a transmission band of a feedback path from the channel filter 206 to the analog-to-digital converter 210 by comparing the digital IF tone signal inputted from the second switch 211 with the reference tone signal generated by the tone signal generator 207.

Then, a signal coupled with the output of channel filter 206 is inputted to the VSB demodulator 212 after passing through the first switch 208, the frequency down converter 209, the analog-to-digital converter 210, and the second switch 211. The VSB demodulator demodulates the input signal and outputs the demodulated signal to the feedback path compensator 214.

The feedback path compensator 214 compensates the demodulated baseband signal from the VSB demodulator 212 based on information about transmission band characteristic for the estimated feedback path, which is estimated by the feedback path estimator 213. A pre-equalizer filter efficient generator (not shown) generates a tap coefficient for the pre-equalizer 201 using the baseband digital signal compensated by the feedback path compensator 214 and the input signal of the VSB modulator 202.

In the present embodiment, the pre-equalizer 201 compensates the amplitude distortion and the phase distortion in a transmission band of the forward path from the VSB modulator 202 to the channel filter 206 as well as the amplitude distortion and the group delay distortion in a band of the channel filter 206.

As described above, the performance of the pre-equalizer can be improved because the tap coefficient of the pre-equalizer is calculated after compensating the amplitude distortion and the phase distortion in the transmission band of the feedback path from the channel filter 206 to the VSB demodulator 212.

In the present embodiment, the tone signal generator was described as a device generating a reference RF signal. However, the present invention is not limited thereto. Any device generating a reference RF signal can be used.

Figure 3:
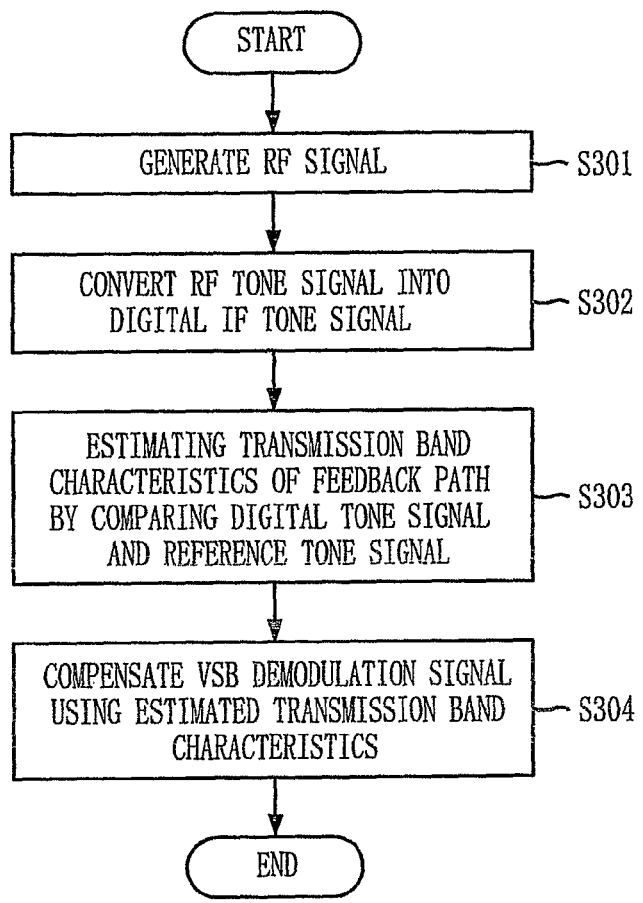
FIG. 3 is a flowchart illustrating a method for compensating a feedback path using a tone signal in accordance with an embodiment of the present invention.

FIG. 3 is a flowchart illustrating a method for compensating a feedback path using a tone signal in accordance with an embodiment of the present invention.

Referring to FIG. 3, a tone signal generator generates an analog RF tone signal of a target frequency corresponding to the transmission band in order to estimate characteristic information for a transmission band of a feedback path at step S301. The analog RF tone signal is converted to an analog IF tone signal by the frequency down converter and the analog IF tone signal is converted to the digital IF tone signal by the analog-to-digital convertor at step S302.

The feedback path estimator estimates amplitude distortion and the phase distortion in a transmission band for the feedback path from the channel filter to the analog-to-digital converter by comparing the converted digital IF tone signal with the reference tone signal generated from the tone signal generator at step S303.

The feedback path compensator compensates the baseband signal demodulated by the VSB demodulator using the characteristics information of the transmission band for the feedback path estimated by the feedback path estimator at step S304. Therefore, the tap coefficient for the pre-equalizer can be calculated using the compensated baseband digital signal the input signal of the VSB demodulator.

FIGS. 4 to 7 are graphs illustrating amplitude distortion and phase distortion of a feedback path.

Figure 4:
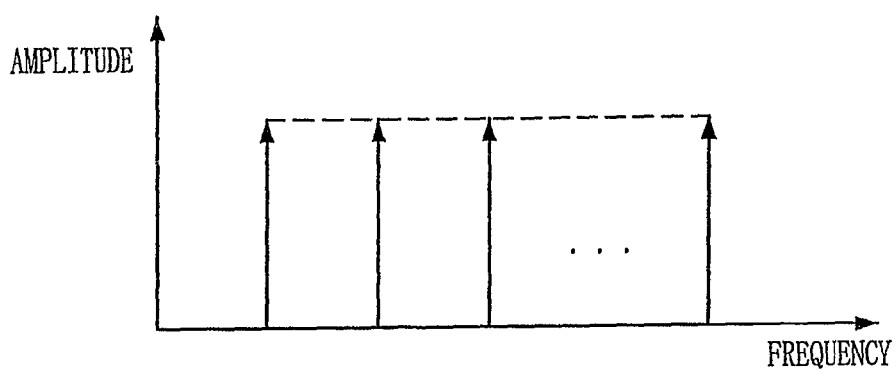
FIGS. 4 to 7 are graphs illustrating amplitude distortion and phase distortion of a feedback path.
Figure 5:
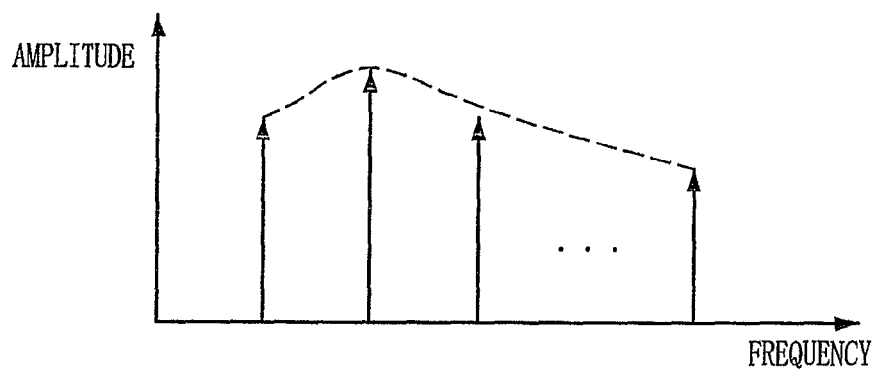
Figure 6:
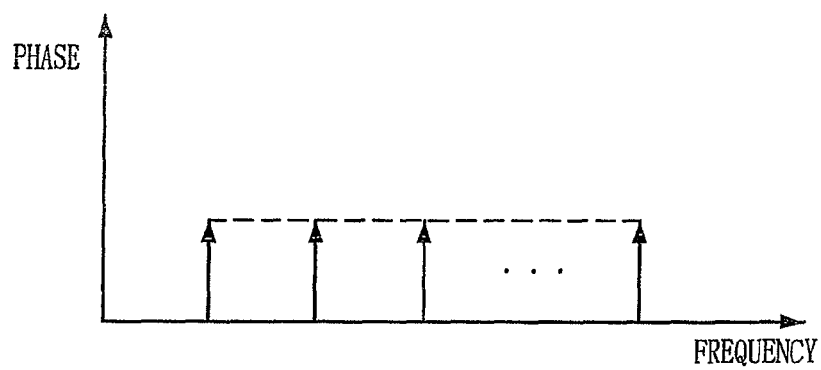

FIG. 4 shows the amplitude of a tone signal in a transmission band, generated by the tone signal generator. FIG. 5 shows the amplitude of a tone signal distorted due to the amplitude distortion of the feedback path. FIG. 6 shows a phase of the tone signal in a transmission band generated by the tone signal generator, and FIG. 7 shows a phase of a tone signal distorted due to phase distortion of a feedback path.

Figure 7:
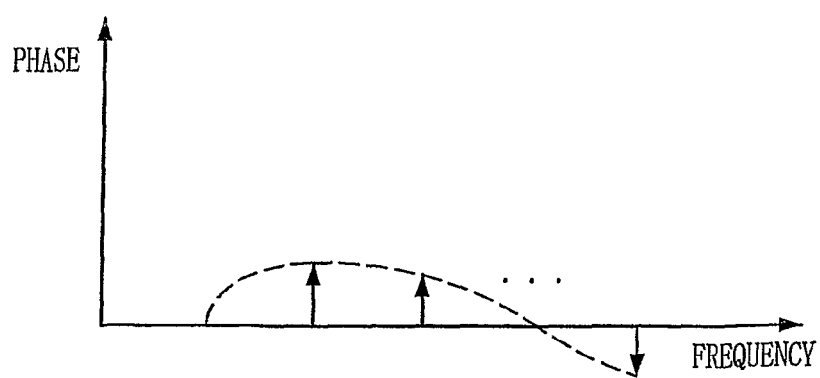

Herein, FIGS. 4 and 5 show a reference value generated by the tone signal generator, and FIGS. 6 and 7 show the amplitude distortion and the phase distortion of a feedback path using the amplitude and phase distorted tone signal.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application Nos. 2006-0125125 and 2007-0082658, filed in the Korean Intellectual Property Office on Dec. 8, 2006, and Aug. 17, 2007, the entire contents of which is incorporated herein by reference.

While the present invention has been described with respect to certain preferred embodiments, it will be apparent to those skilled in the art that various changes and modifications may be made without departing from the spirits and scope of the invention as defined in the following claims.

The invention claimed is:

1. An apparatus for improving a performance of a pre-equalizer in a transmitter of a digital broadcasting system having a feedback path for adaptively generating a filter coefficient of the pre-equalizer, comprising:
 a reference signal generator that generates a reference radio frequency (RF) signal;
 a feedback path estimator that estimates transmission band characteristic information for the feedback path based on the reference RF signal generated from the reference signal generator; and
 a feedback path compensator that compensates a demodulated signal transferred through the feedback path based on the estimated transmission band characteristic information from the feedback path estimator and generates a filter coefficient of the pre-equalizer, wherein the feedback path estimator estimates the transmission band characteristic information for the feedback path by comparing a digital IF signal generated by converting a reference RF signal, which is generated from the reference signal generator while the reference frequency signal is passing through the feedback path, with the reference signal from the reference signal generator.

2. The apparatus of claim 1, further comprising:
a first switch that selects one of a RF signal outputted from a channel filter of the transmitter and a reference RF signal generated by the reference signal generator according to a switching control signal and outputs the selected signal to the feedback path; and
a second switch that selects one of a demodulator and the feedback path estimator and outputs a digital intermediate frequency (IF) signal transferred through the feedback path to the selected one.

3. The apparatus of claim 1, wherein the reference signal generator includes a tone signal generator for generating a reference RF signal.

4. The apparatus of claim 1, wherein the feedback path estimator estimates amplitude distortion and phase distortion in the feedback path.

5. The apparatus of claim 1, further comprising a filter coefficient generator that generates the fitter coefficient of the pre-equalizer using a signal with the amplitude distortion and the phase distortion in the transmission band of the feedback path compensated by the feedback path compensator.

6. A method for improving a performance of a pre-equalizer in a transmitter of a digital broadcasting system having a feedback path for adaptively generating a filter coefficient of the pre-equalizer, comprising the steps of:

a) generating a reference radio frequency (RF) signal;
b) estimating transmission band characteristic information for the feedback path based on the generated reference signal;
c) compensating a demodulated signal transferred through the feedback path based on the estimated transmission band characteristic information for the feedback path; and
d) generating a filter coefficient of the pre-equalizer using the compensated signal, wherein in the step b), a digital intermediate frequency (IF) signal, which is converted while the generated reference RF signal passes through the feedback path, is compared with the reference RF signal in order to estimate the transmission band characteristic information for the feedback path.

7. The method of claim 6, wherein the reference RF signal is generated by a tone signal generator.

8. The method of claim 6, wherein the transmission band characteristic information includes amplitude distortion and phase distortion in the feedback path.

9. The method of claim 6, wherein in the step d), a signal with the amplitude distortion and the phase distortion compensated, which exist in the feedback path, and an input signal of a modulator are used to generate the filter ter coefficient of the pre-equalizer.

* * * * *